(12) United States Patent
Williams et al.

(10) Patent No.: US 6,859,214 B2
(45) Date of Patent: Feb. 22, 2005

(54) USER INTERFACE MECHANISM FOR MANIPULATING CONTEXT IN COMPUTER MANAGEMENT APPLICATIONS

(75) Inventors: Evelyn L Williams, Longmont, CO (US); Mark S. Anspach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 09/988,969

(22) Filed: Nov. 20, 2001

(65) Prior Publication Data

US 2002/0054142 A1 May 9, 2002

Related U.S. Application Data

(63) Continuation-in-part of application No. 09/087,066, filed on May 29, 1998, now Pat. No. 6,344,862.

(51) Int. Cl.[7] .............................................. G06F 3/14
(52) U.S. Cl. ....................... 345/781; 345/804
(58) Field of Search ................................. 345/762, 765, 345/744, 781, 804, 810, 840, 854

(56) References Cited

U.S. PATENT DOCUMENTS 5,644,738 A * 7/1997 Goldman et al. ........... 345/825
6,097,887 A * 8/2000 Hardikar et al. ............ 717/105

* cited by examiner

Primary Examiner—Cao (Kevin) Nguyen

(57) ABSTRACT

Contextual information that is presented to the user of a windows-based computer environment through the user interface of a single open window of the environment may be readily filtered and changed by appropriate manipulation by the user of a context control feature of the user interface. Manipulation of the context control feature allows the user to look at a given set of objects or tasks from different views or perspectives. It also provides the user with access to a different set of objects, thereby allowing the user to look at a different set of objects or tasks from the same view or perspective as an earlier set of objects or tasks.

43 Claims, 11 Drawing Sheets

USER INTERFACE MECHANISM FOR MANIPULATING CONTEXT IN COMPUTER MANAGEMENT APPLICATIONS

The instant application is a continuation-in-part application of U.S. patent application Ser. No. 09/087,066 filed on May 29, 1998 U.S. Pat. No. 6,344,862.

CROSS REFERENCES TO RELATED APPLICATIONS

The subject matter of the present application is related to copending U.S. application, Ser. No. 09/086,635, titled "A Method and System to Provide Functionality Access Based on User Approach to Network and System Management Tasks", filed May 29, 1998 contemporaneously with the parent application (Ser. No. 09/087,066) of the instant CIP application and issued on Jan. 16, 2001 as U.S. Pat. No. 6,175,363, and copending U.S. application, Ser. No. 09/087,583, titled "A User Interface Mechanism for Maintaining Quick Access to Important Information in a Windows-Based Computer Environment", filed May 29, 1998 contemporaneously with the parent application (Ser. No. 09/087,066) of the instant CIP application and issued on Mar. 28, 2000 as U.S. Pat. No. 6,043,816, both of which are assigned to the assignee hereof and are herein incorporated by reference.

FIELD OF THE INVENTION

The present invention relates generally to windows-based computer applications, and more particularly to a user interface mechanism for manipulating context in windows-based computer applications, such as network and systems applications.

BACKGROUND OF THE INVENTION

Many computer environments employ windows having graphical user interface (GUI) capabilities that aid the user in interacting with various applications in a straight-forward and intuitive manner. Whether the user is operating a stand-alone computer, a networked computer, or other equipment in the computer environment, graphical user interfaces presented in windows have become the environment of choice for many users rather than command line interfaces. The windows-based computer environment enables the user to access any number of computer applications simply by opening an appropriate window for the desired application.

Typically a user operating in a windows-based computer environment must open a new window each time that a new application is to be used. Many applications do not have all of the functionality needed to accomplish all aspects of a user's job (e.g. editing graphics). Assume that a user has two graphical editing applications, one application provides editing capabilities for vector graphics and the other provides editing of pixel-based graphics. If the user has been editing vector graphics with one application and now wants to edit pixel-based graphics, the user must first open a second graphics editing application in a new window. It is not currently possible to access the pixel-based graphics editing application from the open application for editing vector graphics since a separate window must be opened for each application. There is therefore a requirement of a one-to-one correspondence between a computer application and a window that supports the application. For anyone using a sizable number of windows-based applications, this means that the user must open a great number of windows.

A disadvantage of this requirement is that any open window must be managed by a window manager of the graphical user interface (GUI) that produces and drives windows on a display. A window manager is a software program or module that defines the parameters of windows and generates the windows. The more windows that are open in a computer environment, the more that overhead associated with window manager programs will slow down the operation of the environment. The excess of windows also creates cognitive overhead for the user in that they have to deal with minimizing, restoring, and moving windows to be able to interact with the separate applications.

Another common characteristic of graphical user interfaces, particularly for those addressing network systems and service management, is that they primarily provide a single view of objects and a single set of capabilities for manipulating the objects they present. Typically there is no means to see objects from different perspectives. For example, if a user is accessing an application to look at the configuration of a computer, they cannot easily see that same computer from the perspective of where it sits in a network and how it communicates with other computers. To do this users typically need to bring up separate applications and take actions to locate the desired object in both. And if the user can see the objects from different perspectives, the different perspectives and related functionality are typically intermixed causing an overload of functionality.

A somewhat less common aspect of graphical user interfaces is the use of information about the current context to aid the user in performing tasks. For instance, information on where the pointer is located when the mouse is clicked is used to filter pop-up menus. Information on the pointer position or specific location in an application is used to provide context sensitive help. However, there has been no attempt to use context at a higher level to provide users with different information sets or different perspectives on a given information set. User task performance would greatly benefit from an explicit mechanism by which users can designate the perspective they want to take in interacting with a set of applications. Applications could then use this contextual information to determine the type of data and functionality to be presented, the manner in which the data will be presented (e.g., different layouts based on the types of object relationships that are associated with the context), and the default parameters to be used (e.g., systems may be polled every 30 minutes in a system context to make sure they are up and running; however, in an application context they may be polled every 10 minutes to determine if the application is still running)

There is therefore an unmet need in the art to be able to minimize the number of windows that are required for related applications or application functionality. Additionally, there is an unmet need in the art to allow users to designate a context and have applications share relevant contextual information in such a way that will allow for the presentation of data and functionality based on the perspective associated with that context.

SUMMARY OF THE INVENTION

According to the present invention, a method provides contextual information to a user of a windows-based computer environment. This method comprises opening a window having a user interface and manipulating a context control feature of the user interface to determine a first context of the window corresponding to at least a first perspective of one or more perspectives for viewing and manipulating one or more objects, with each object of the one or more objects having one or more object capabilities within the window. The first perspective presents a filtered view of at least one of the one or more object capabilities of the one or more objects corresponding to the first perspective.

Also in accordance with the present invention, a user interface of a window provides contextual information to a user of a windows-based computer environment. The user interface comprises a context control feature and a content pane. The context control feature has one or more available contexts operable to present one or more corresponding perspectives within the window. Manipulating the context control feature of the user interface determines a context of the window from the one or more available contexts corresponding to at least a first perspective of the one or more perspectives for viewing and manipulating a plurality of objects. Each object of the plurality of objects has one or more object capabilities that are illustrated in the content pane of the user interface of the window. The first perspective presents a filtered view of at least one of the one or more object capabilities of the one or more objects corresponding to the first perspective.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

Contextual information is often used to filter information in the user interface of a windows-based computer environment. It is thus useful as a filtering tool to provide information to the user that is consistent with the objects or applications the user is currently using or the perspective from which the user is viewing the objects or applications. The present invention employs the user interface of a single open window, such as an application window, to empower the user to assert direct control over the filtering of information and the perspective from which information is presented to the user in the single window. Through the manipulation of a context control feature of the user interface, the user can choose the desired context for the window. The context is defined such that the objects that appear in the window, their relationships, and capabilities for manipulating the objects are tied to the context. For instance, using the present invention, the user may see the network connectivity of a computer system or the IT services (e.g., email, file sharing) in which the system participates all inside a single window by correctly manipulating the context control feature of the window. The context of the window may be readily changed as desired, again through appropriate manipulation of the context control feature.

The context control feature, which may be a context list box, a context tab, or other control feature of the user interface, contains a list of the contexts available within the window. User manipulation of context through the context control feature of the window is accompanied by a corresponding change in menu items, toolbar buttons, and views of presented objects according to the context chosen by the user. Relevant information from the initial context, such as currently selected objects, is maintained in the new context of the window and can be used to aid users in quickly accessing task relevant information or functionality. This feature makes the user more efficient in the task at hand.

Manipulation of the context control feature of the GUI of a single window can enable the user to look at a given set of managed objects in a different perspective or context. Alternatively, changing context can mean the user will have access to a different set of objects. Thus the user can look at a different set of objects from the same perspective as an earlier set of objects.

First, consider the use of the present invention as an explicit mechanism for filtering information and changing the perspective from which information is presented to the user via the user interface. A change in context via the context control mechanism is typically associated with a change in one or more of the objects presented and the type of capabilities available or visible to the user for manipulating those objects.

Figure 1A:
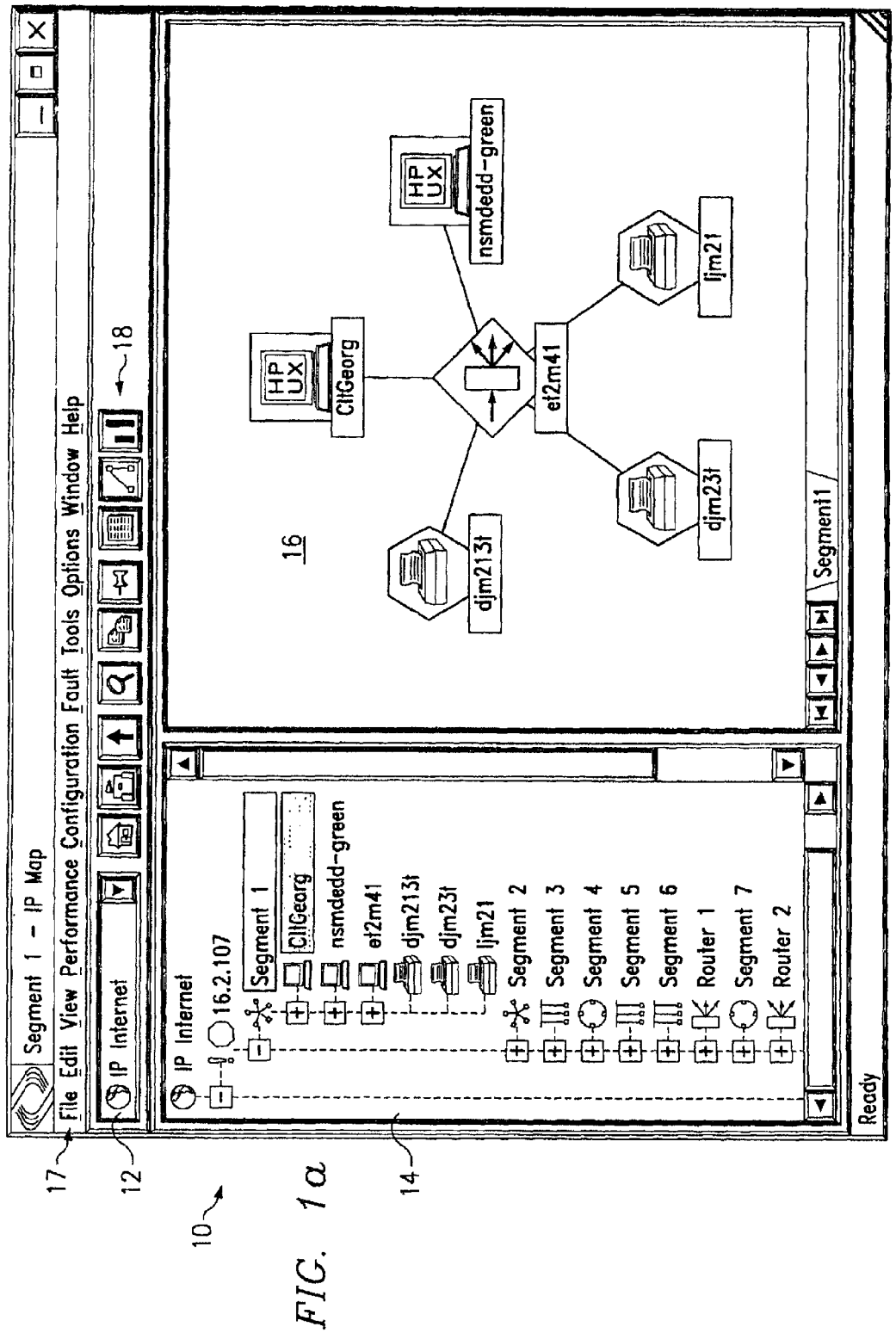
FIGS. 1a and 1b illustrate the use of a context list box in an application window that presents views of objects and provides functionality for acting on those objects, according to one embodiment of the present invention.
Figure 1B:
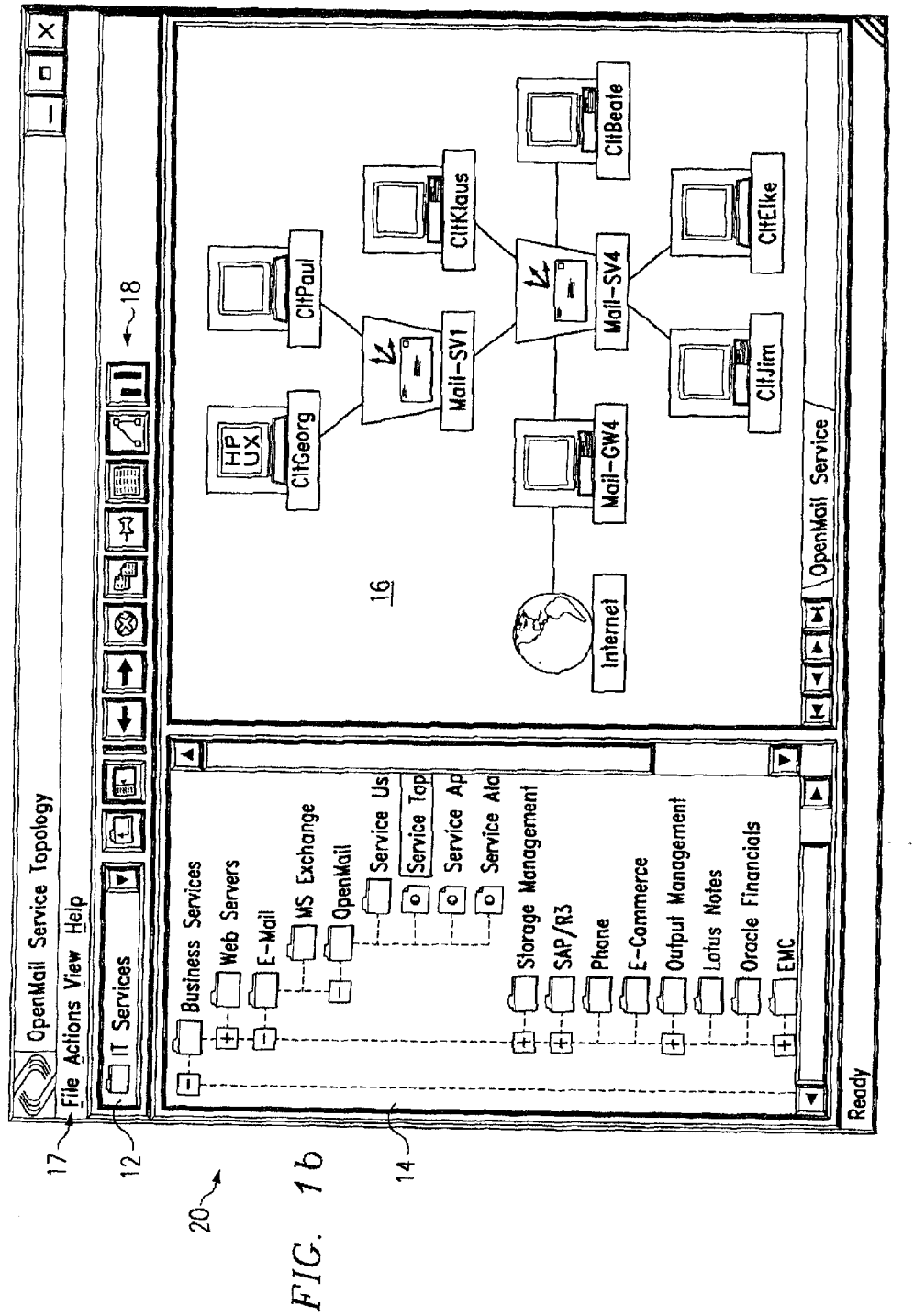

Consider, for example, an application window in which the user can change between the context for the IP Network Management and the context for Service Management using the context control mechanism of the context list box. This use of the context list box is illustrated in FIGS. 1a and 1b. Referring to FIG. 1a, the context list box 12 of the user interface 10 has been set to "IP Internet" and the location cursor is on "Segment 1" in scoping pane 14 so that the context of user interface 10 is IP Internet. The content pane 16 illustrates the IP Internet perspective of objects of Segment 1 of the IP Internet: CltGeorg, nsmdedd-green, et2m41, djm213t, djm23t, and ljm21; note that objects CltGeorg, nsmdedd-green, djm213t, djm23t, and ljm21 are all connected to one another through the network hub et2m41 as indicated by the graphical map configuration shown in content pane 16. In FIG. 1b, the same application window with a different context is presented to the user. Context list box 12 has been set to "IT Services" and scoping pane 14 is set to show different types of services so that user interface 20 has a Service Management context. Content pane 16 illustrates the objects involved in the OpenMail service. Note that the selected object "CltGeorg" from user interface 10, has been carried over to show this same object from the new perspective of Service Management. This system is now connected to the mail server "Mail-SV1" that provides email to the system. Notice that available menus 17 and tool bar buttons 18 have been changed to match the new context. By simply manipulating the context chosen in context list box 12, the user explicitly filters information and changes the perspective from which information concerning managed objects is presented to the user.

Figure 2A:
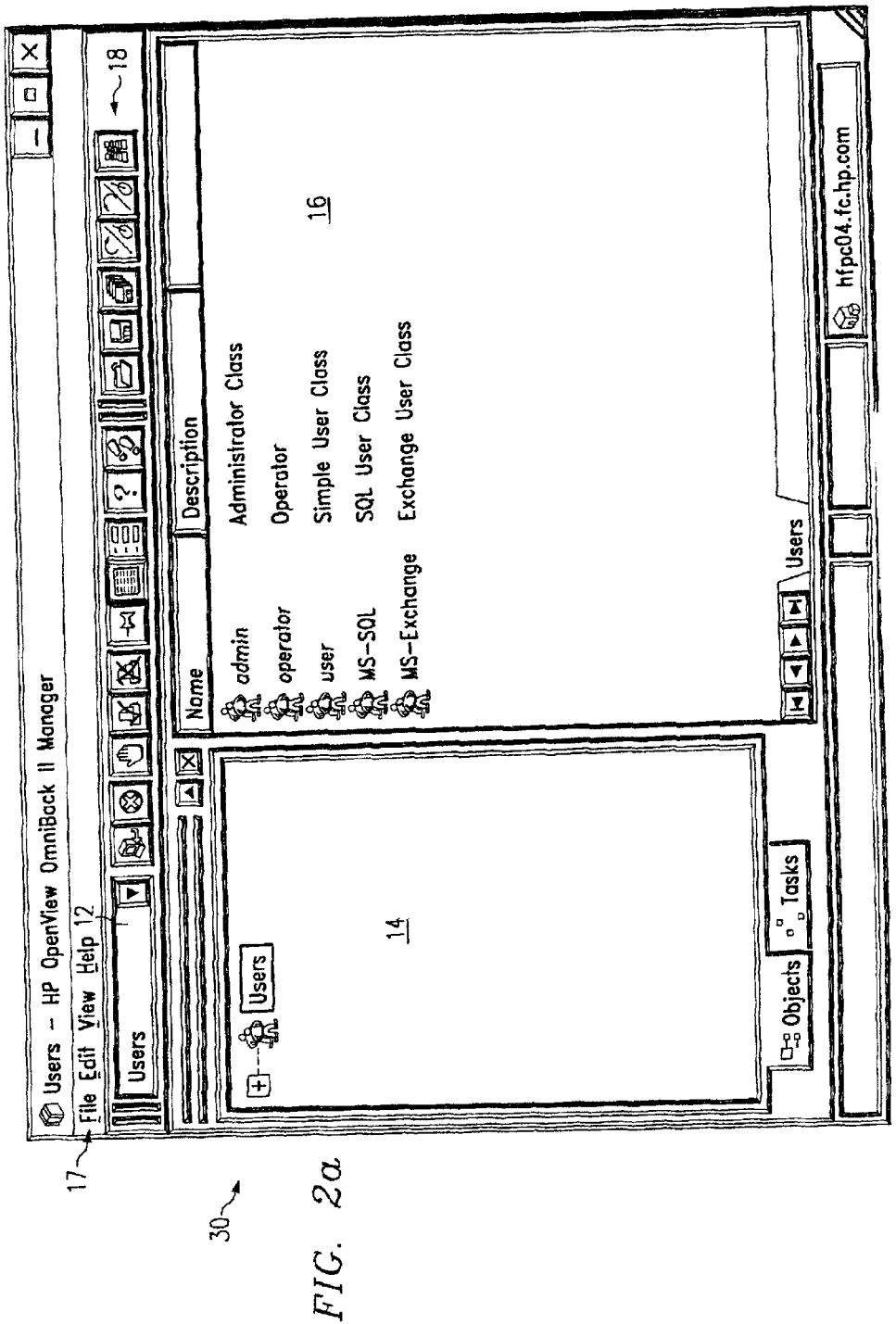
FIGS. 2a, 2b, 2c and 2d illustrate the use of a context list box in an application window that allows users to access different types of objects or applications, according to one embodiment of the present invention.
Figure 2B:
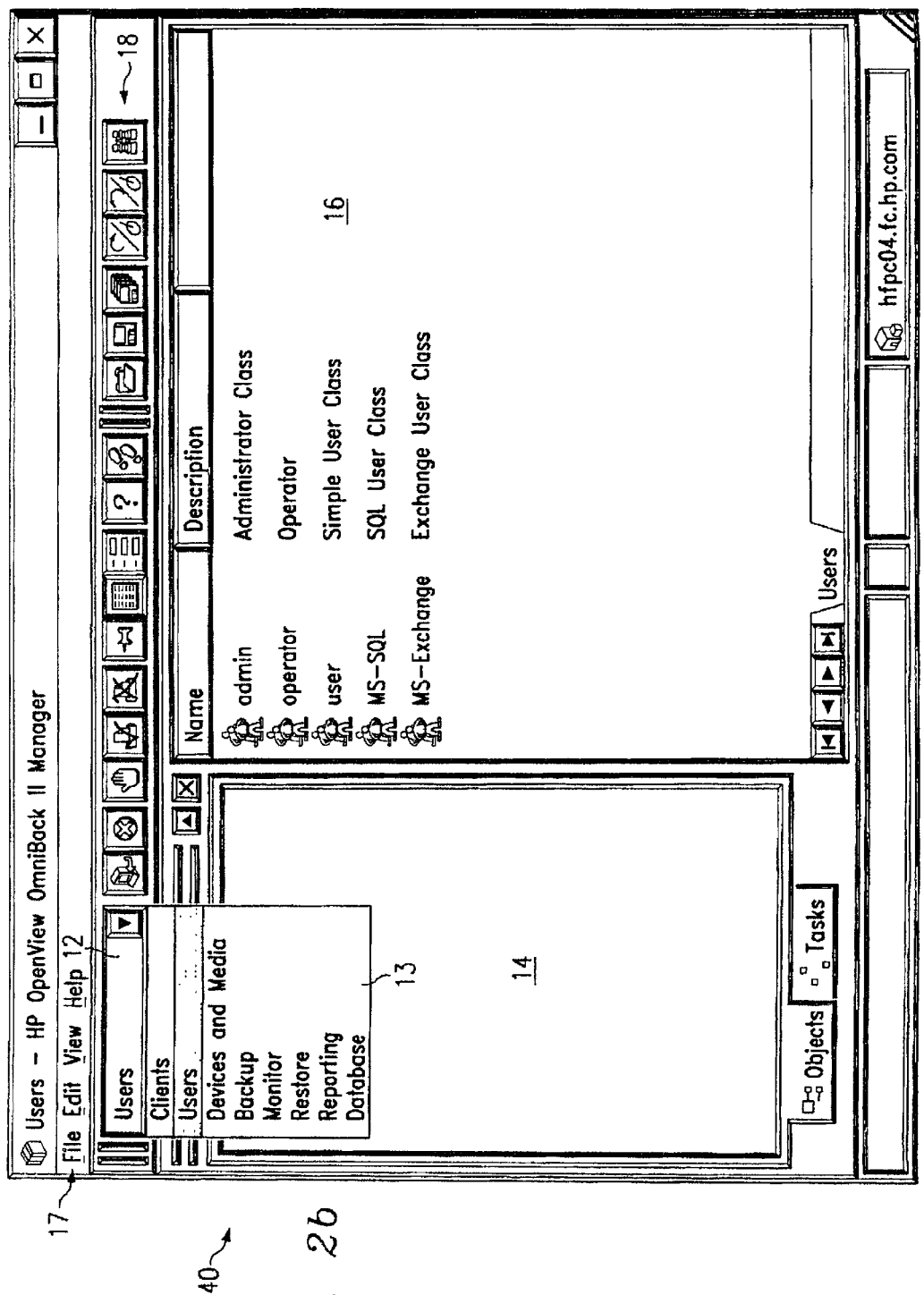
Figure 2C:
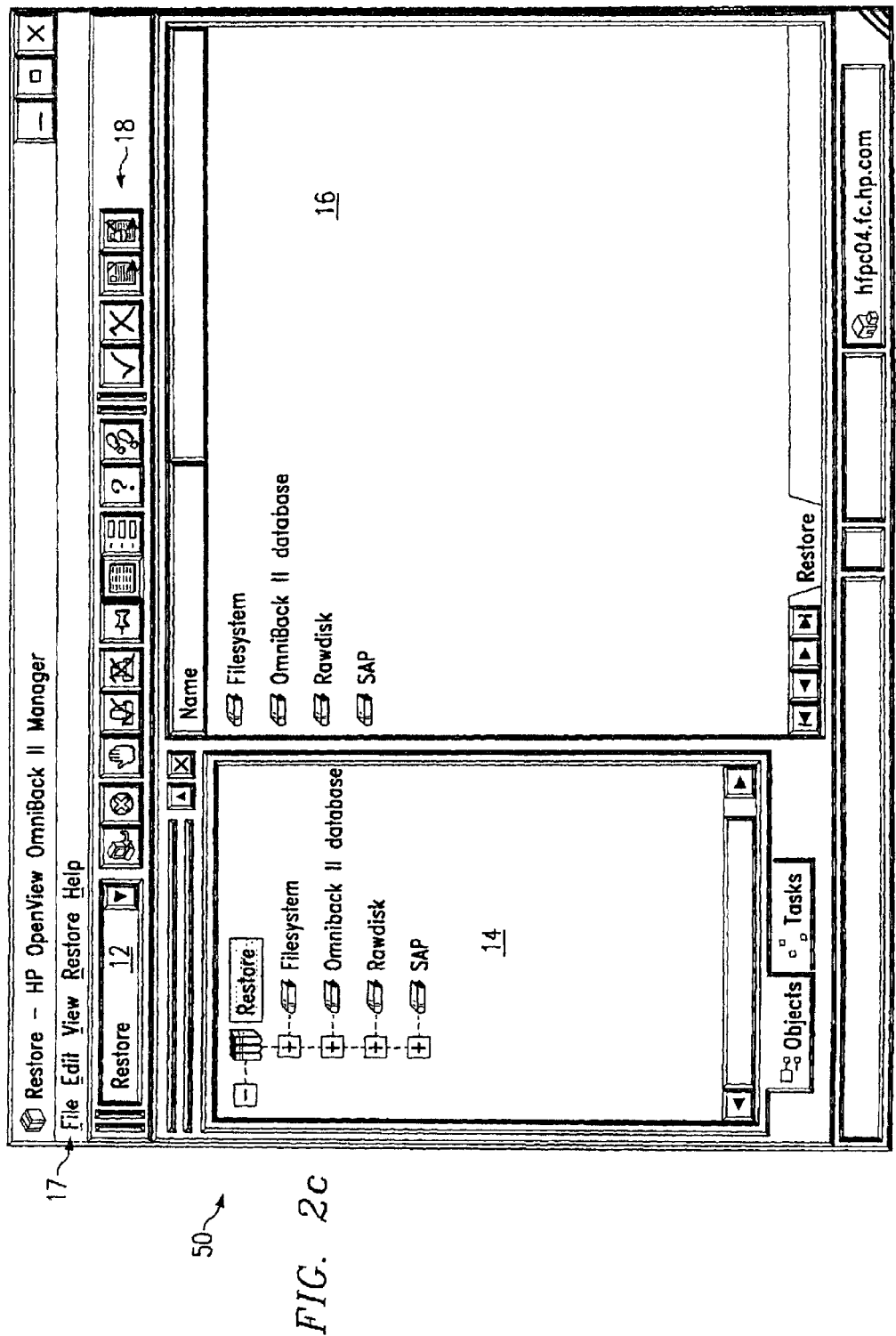

Now consider an example in which context is used to view different objects or applications. This use of the context control is illustrated in FIGS. 2a, 2b, and 2c. In FIG. 2a, the context chosen in the application window of user interface 30 is "Users" as shown in context list box 12 and scoping pane 14. In this example, "Users" is the only visible choice in the scoping pane but this item could be expanded by the user to display additional choices. The objects illustrated in content pane 16 include the following user groups: admin, operator, user, MS-SQL, and MS-Exchange. These are the groups of users that are allowed to do backup and recovery of files within the application.

Typically, using the context control feature, a user will be able to choose from two or more types of context. As illustrated in the user interface 40 of the application window of FIG. 2b, by clicking on the context list box 12, the user is presented with a context list 13 showing all of the contexts available in the current window. In user interface 40, users can choose from: Clients, Users, Devices and Media, Backup, Monitor, Restore, Reporting, and Database. In this figure, the context list 13 is presented in an expanded combination ("combo") box as shown. By selecting one of the contexts in the list, the user moves to that context. If the user selected "Restore" from the context list 13, he or she would be presented with the user interface in FIG. 2c.

Figure 2D:
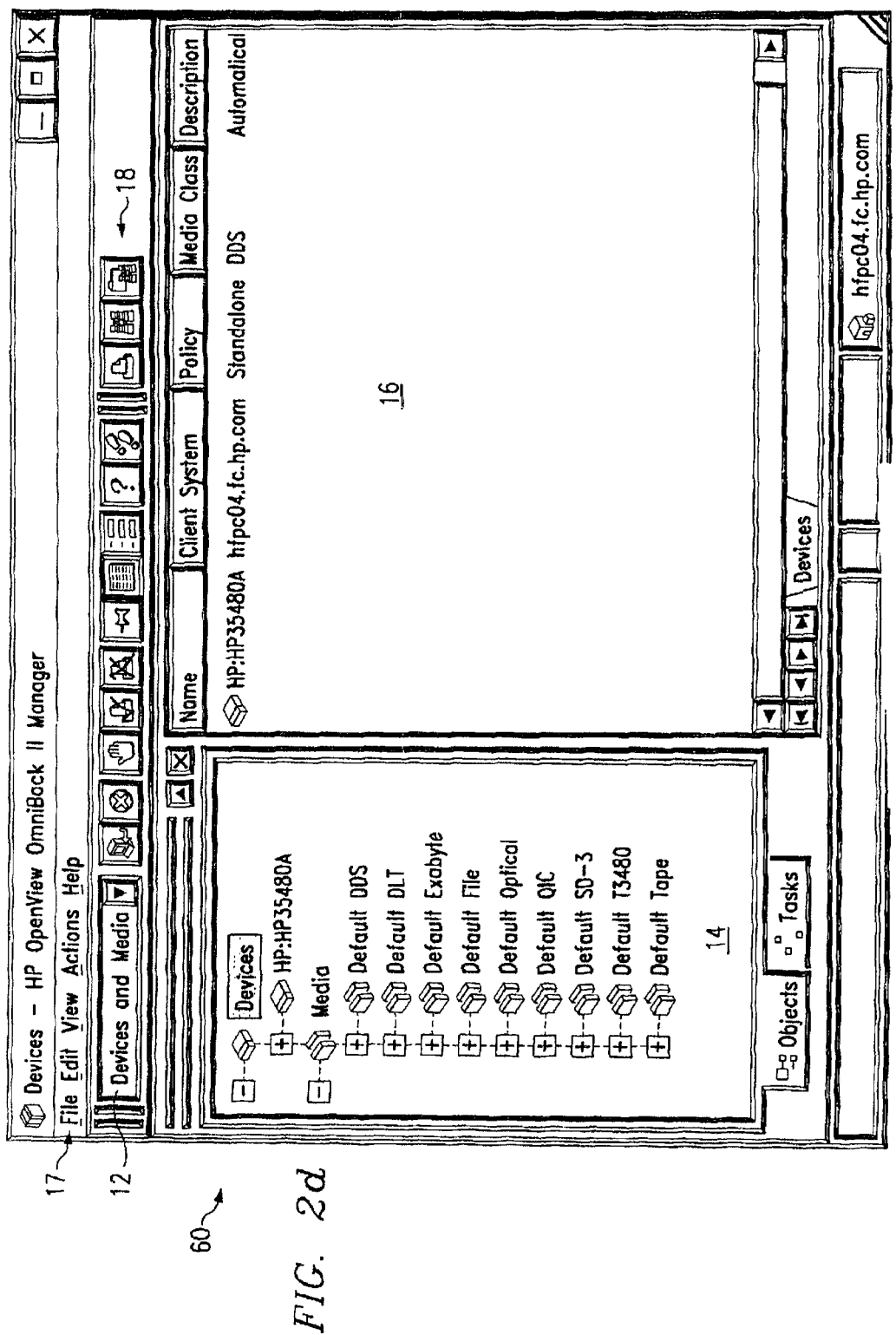

In FIG. 2c, the context of the application window 50 has been changed to "Restore", as shown in context list box 12 and scoping pane 14. The available objects to restore are shown in content pane 16 and include: Filesystem, Omni-Back II database, Rawdisk, and SAP. FIG. 2d illustrates another context within the same window. "Devices and Media" is the current context as shown in context list box 12. Selection of this context from the context list (14 in FIG. 2b) allows the user to see what backup devices are available and what media have been configured for doing backups. The devices and media are shown in scoping pane 14 of user interface 60. Notice that different menu items 17 are available in the three contexts shown in FIGS. 2a, 2c, and 2d.

Figure 3A:
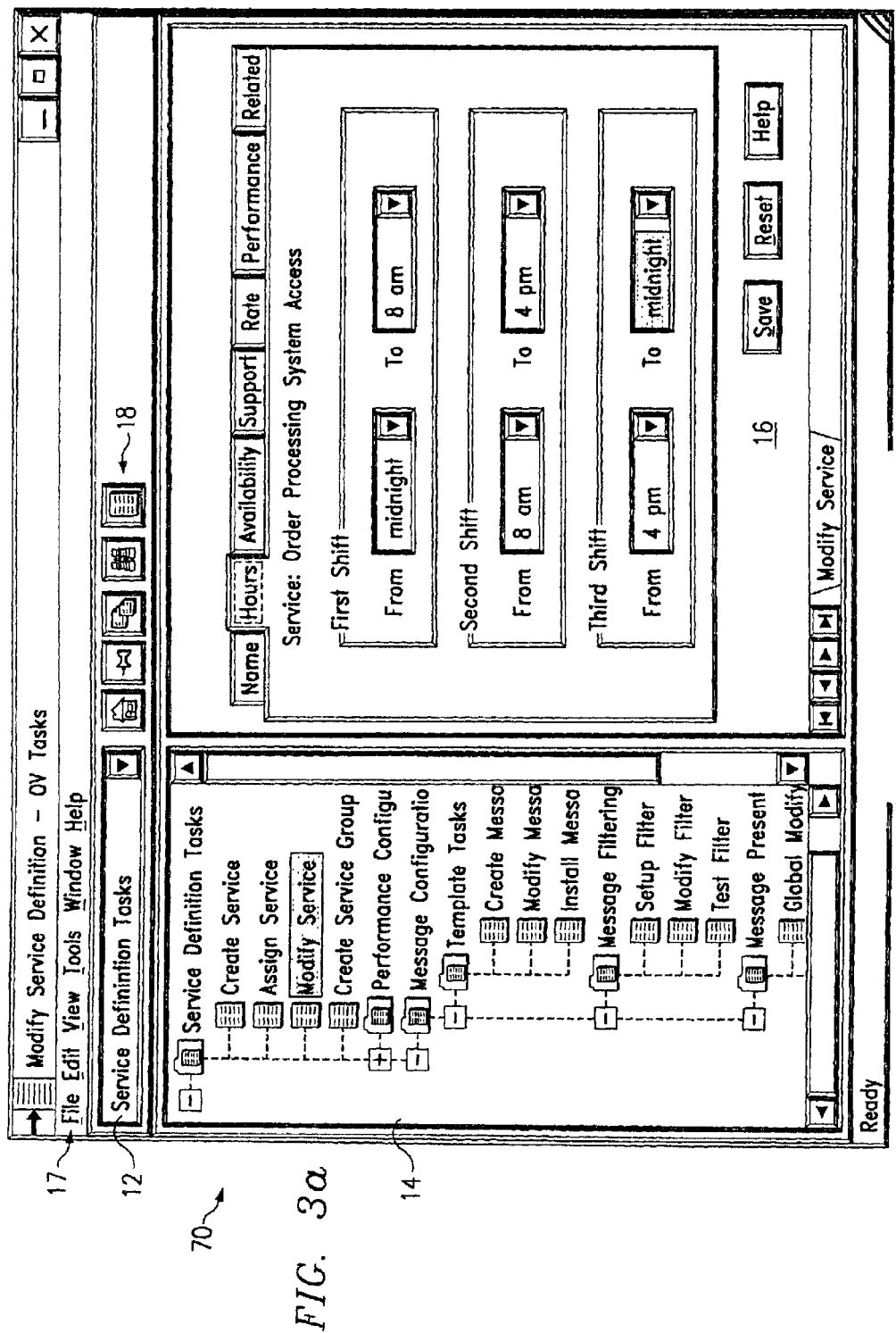
FIGS. 3a and 3b illustrate the use of a context list box in an application window that provides lists of tasks and allows users to access the user interface for accomplishing those tasks, according to one embodiment of the present invention.
Figure 3B:
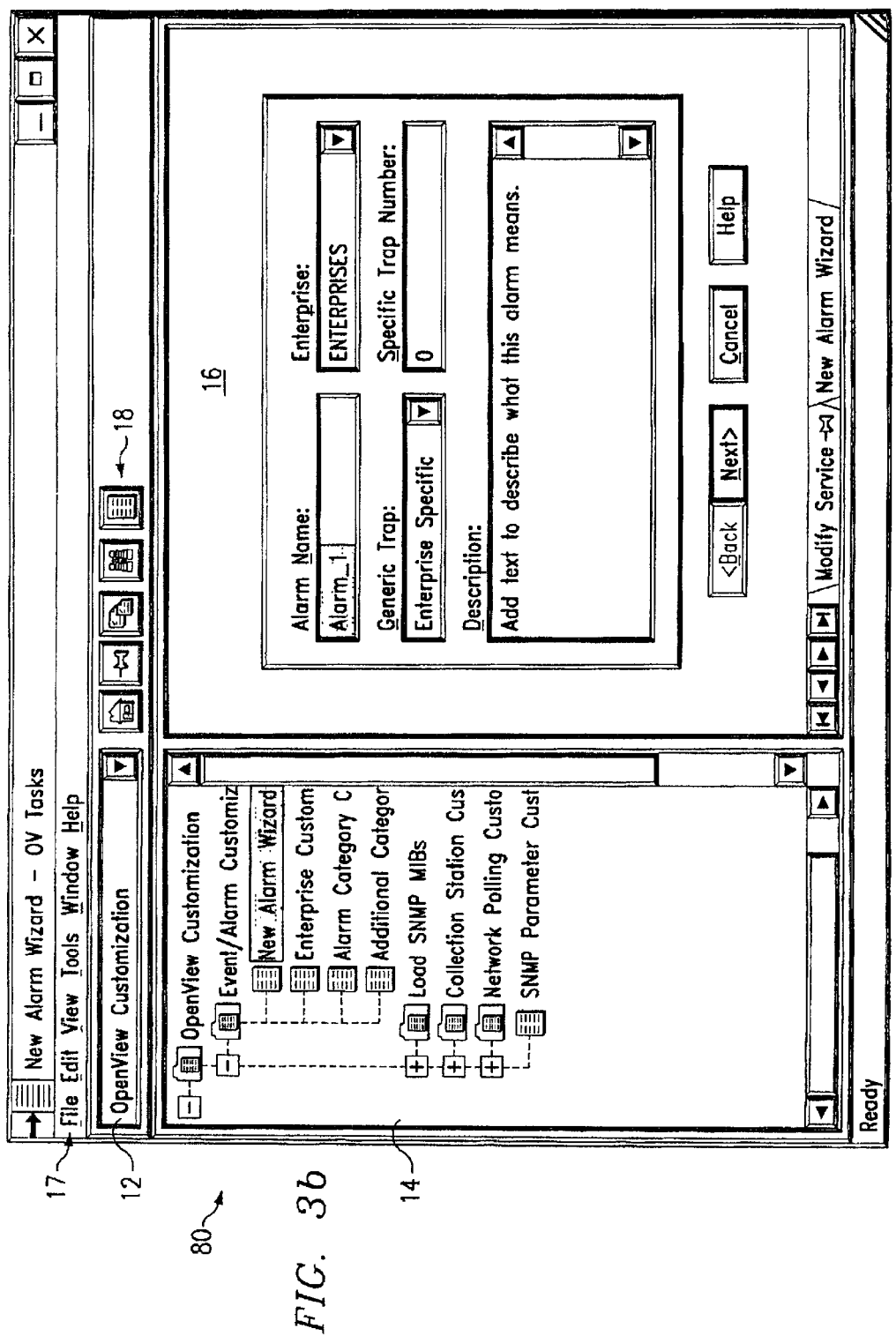

In addition to being applicable to application windows that display objects, the current invention is equally applicable to application windows that present tasks. Referring now to FIGS. 3a and 3b, the use of the context list box 12 in a task application window is illustrated. In FIG. 3a, the context list box 12 of the user interface 70 has been set to "Service Definition Tasks" and the task "Modify Service" has been chosen in scoping pane 14. The scoping pane in this context shows the hierarchy of tasks that are related to defining the services that an IT group would provide its customers. The selected item "Modify Service" is one of the many different service definition tasks. Content pane 16 illustrates the properties box associated with modifying the service named Order Processing System Access. FIG. 3b presents the same task application window "OV Tasks" with a different context. The context list box 12 has been set to OpenView Customization. The change in the context list box results in setting the context for user interface 80 to OpenView Customization. The scoping pane 14 now presents the hierarchy of the tasks associated with customizing OpenView applications. Selecting "New Alarm Wizard" in the scoping pane causes the content pane 16 to present a wizard containing the fields for the data the user must provide to complete the task. Again, by simply manipulating the context chosen in context list box 12, the user explicitly filters information and is presented with that subset of the information that is relevant to the context in the same application window.

Figure 4A:
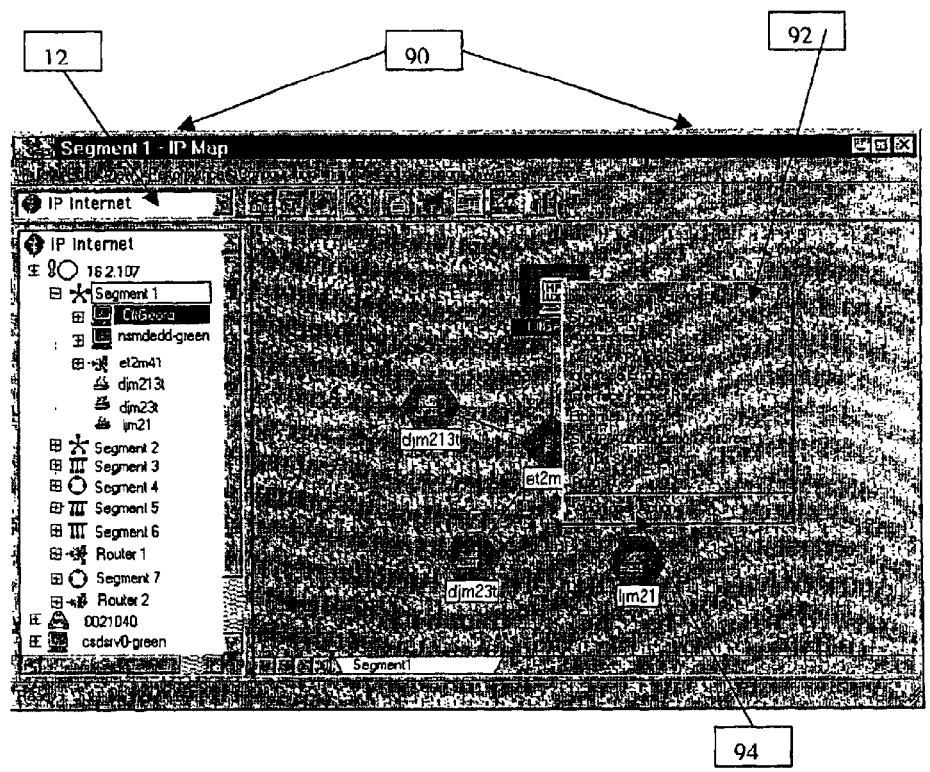
FIGS. 4a and 4b illustrate the impact of contextual perspectives on the functionality available for manipulating the same object in two or more different contexts each having a different perspective, according to one embodiment of the present invention.
Figure 4B:
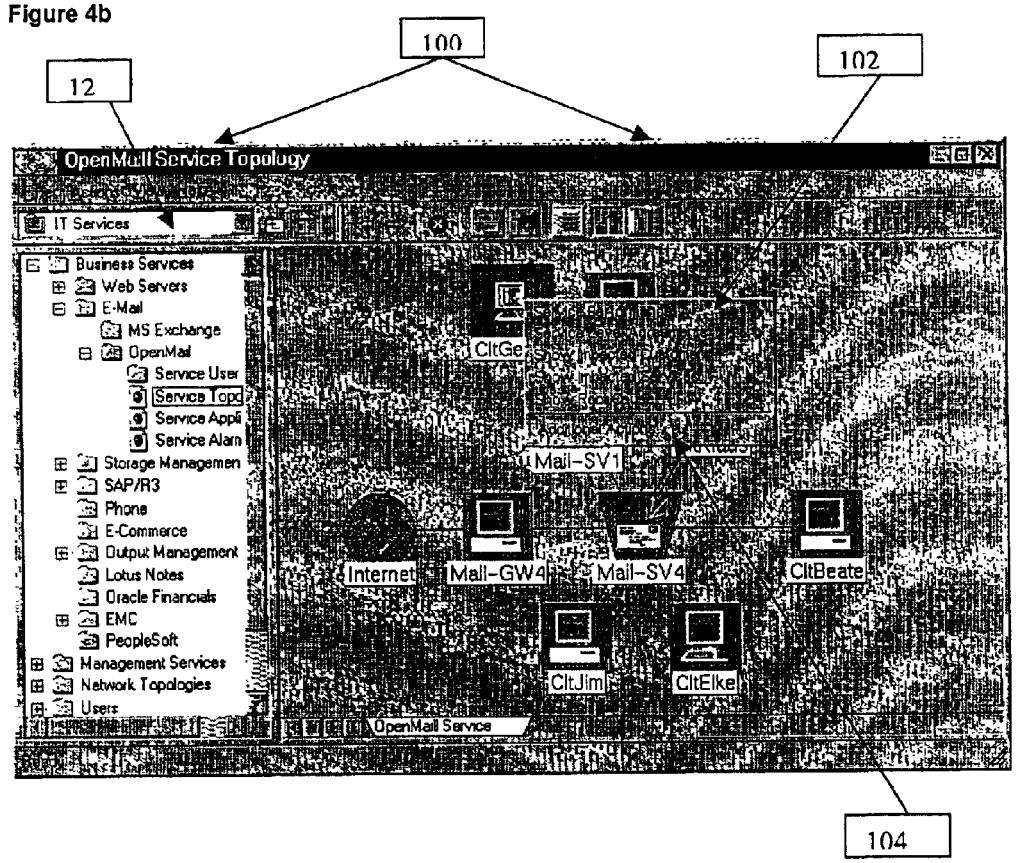
Figure 4C:
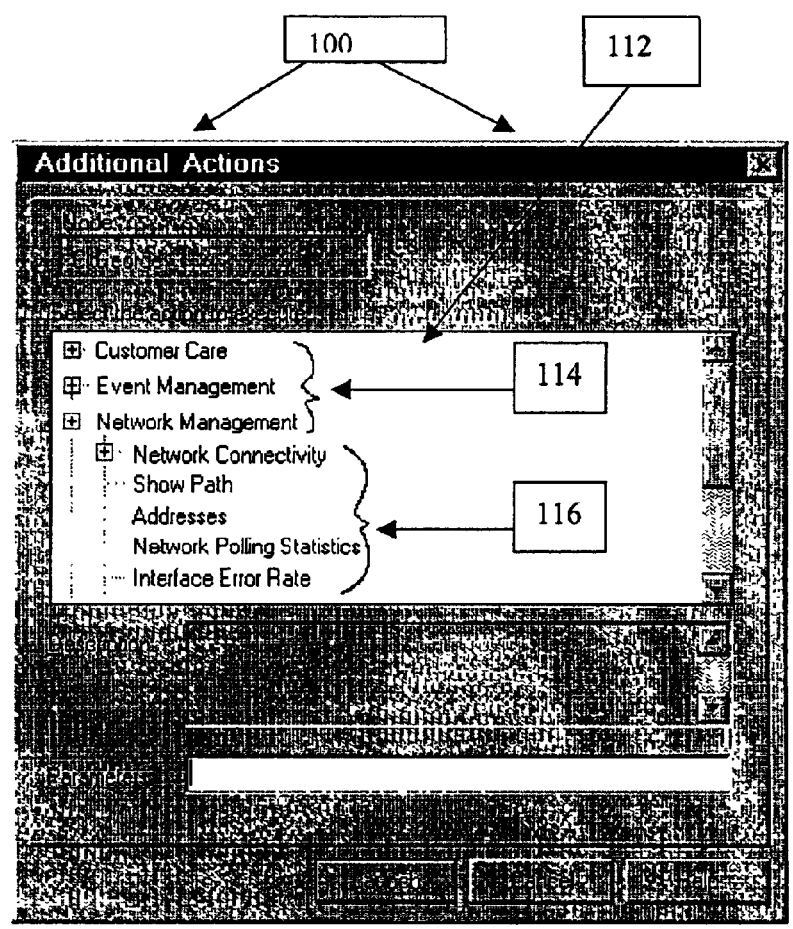
FIG. 4c illustrates a mechanism by which manipulations associated with other perspectives can be made available to the user while keeping the manipulations relatively hidden, according to one embodiment of the present invention.

For the figures shown above, a change in the context in which information is presented to users will likely result in a change in the functionality that is available in the menu bar 17 and toolbar buttons 18, the objects, tasks, or tools available in the scoping pane 14 from which the user may choose, and the views that can be presented in content pane 16 of the user interface. The change in context can filter out functionality or object capabilities associated with other perspectives or it can selectively make some object capabilities or functionality less visible than the functionality associated with the current perspective of an object but still available to the user. As can be seen in user interface 90 of the application window of FIG. 4a, the context list box 12 has been set to "IP Internet." The pop-up menu 92 for system "CltGeorg" has been accessed. In this context, all of the menu items shown, which are one or more object capabilities corresponding to this particular perspective of the selected object "CltGeorg," are related to the network status. Additional capabilities, shown as "Additional Actions" menu 94, which are associated with another perspective of this object, are not selected and thus not shown in this particular perspective view of the "CltGeorg" object. In FIG. 4b, the same application with a different context and thus perspective is presented to the user. The context list box 12 has been set to "IT Services". Note that user interface 100 shows the same selected object "CltGeorg" from user interface 90 from FIG. 4a but from the new perspective of service management. The pop-up menu 102 for system "CltGeorg" now shows only menu items associated with the services and service status. None of the functionality associated with network management is visible. Users can access functionality associated with other contexts by clicking on the "Additional Actions.." menu item 104. This results in the presentation of a separate pop-up dialog, user interface 110, that contains a list box 112 with all of the actions (or capabilities) associated with object "CltGeorg" from other contexts 114, as shown in FIG. 4c. Note that the menu items 92 from the IP Internet context in FIG. 4a appear in this dialog box as actions 116 under the Network management category. By separating the functionality or object capability (ies) associated with the current contextual perspective from functionality associated with other context perspectives, users are not over burdened with irrelevant functionality. However, users are conveniently able to access this functionality without the need to change contexts.

It is envisioned that the information presented in content pane 16 may take any form relevant to the data being presented, for example graphical, tabular, properties, wizard or chart form. The content panes 16 of FIGS. 1a and 1b, for instance, show information in graphical form; content pane 16 of FIG. 1a shows a network map, while FIG. 1b shows a service topology. tabular form. The content pane of FIG. 3a shows a properties box while the content pane of FIG. 3b shows a wizard.

The present invention therefore provides many advantages to the user. The user can focus on information that is relevant to the current task and this information can in turn be shared by various applications as context filters in order to vary the way that information is presented to the user. This enables the information presentation of the user interface to match the preferences and needs of the user as the user interacts with the computer system. Moreover, the sharing of contextual information allows independently developed applications to appear to the user as highly integrated applications that work closely together within a single user interface window in the computer environment.

The judicious manipulation of context can also enhance the productivity of the user. Contextual information such as the currently visible view or recent user actions can be used to set defaults that minimize the need for user input.

The contextual information can be used to filter irrelevant information or steps so that users can more quickly reach their goals. The passing of contextual information between software within an application and between applications can eliminate the need for the user to duplicate their previous actions.

While the invention has been particularly shown and described with reference to a preferred embodiment, it will be understood by those skilled in the art that various changes in form and detail may be made therein without departing from the spirit and scope of the invention.

What is claimed is:

1. A method for providing contextual information to a user of a windows-based computer environment, said method comprising:

opening a window having a user interface; and manipulating a context control feature of the user interface to determine a first context of the window corresponding to at least a first perspective of one or more perspectives for viewing and manipulating one or more objects, with each object of the one or more objects having one or more object capabilities within the window, wherein the first perspective presents a filtered view of at least one of the one or more object capabilities of the one or more objects corresponding to the first perspective.

2. The method of claim 1, wherein the step of manipulating the context control feature is not performed and the first context of the window is set as a default by an application of the window.

3. The method of claim 1, wherein manipulating the context control feature comprises changing a context tab of the user interface.

4. The method of claim 1, wherein manipulating the context control feature comprises selecting a context identifier from a context list.

5. The method of claim 1, wherein the first context of the window is a view of a set of objects.

6. The method of claim 1, wherein the first context of the window is a set of tasks.

7. The method of claim 1, further comprising manipulating the context control feature to determine a second context of the window corresponding to a second perspective for viewing the one or more objects within the window.

8. The method of claim 7, wherein information shared by the first context and the second context is maintained by the second context when the context control feature is manipulated to determine the second context.

9. The method of claim 7, wherein the first context of the window corresponding to the first perspective is a first view of a set of objects and the second context of the window corresponding to the second perspective is a second view of the set of objects.

10. The method of claim 7, wherein the first context of the window is a view of a first set of objects and the second context of the window is a view of a second set of objects.

11. The method of claim 1, further comprising:

the first perspective making available for viewing one or more object capabilities of the one or more objects corresponding to a second perspective.

12. The method of claim 11, wherein the at least one of the one or more object capabilities corresponding to the first perspective of the filtered view are more visible to a viewer of the user interface than are the one or more object capabilities corresponding to the second perspective.

13. The method of claim 11, wherein the one or more object capabilities corresponding to the second perspective are hidden from view in the user interface of the first perspective unless a manipulation of the user interface of the first perspective is performed to display the one or more object capabilities corresponding to the second perspective.

14. A computer-readable medium having a computer program for filtering information to provide contextual information about a perspective of objects to a user of a windows-based computer environment, said computer program comprising:

instructions for opening a window having a user interface; and instructions for manipulating a context control feature of the user interface to determine a first context of the window corresponding to at least a first perspective of one or more perspectives for viewing and manipulating one or more objects, with each object of the one or more objects having one or more object capabilities within the window, wherein the first perspective presents a filtered view of at least one of the one or more object capabilities of the one or more objects corresponding to the first perspective.

15. The method of claim 14, wherein the instructions for manipulating the context control feature are performed by default by the computer program.

16. The medium of claim 14, wherein instructions for manipulating the context control feature comprises instructions for changing a context tab of the user interface.

17. The medium of claim 14, wherein manipulating the context control feature comprises instructions for selecting a context identifier from a context list.

18. The medium of claim 14, wherein the first context of the window is a view of a set of objects.

19. The medium of claim 14, wherein the first context of the window is a set of tasks.

20. The medium of claim 14, further comprising instructions for manipulating the context control feature to determine a second context of the window corresponding to a second perspective for viewing the one or more objects within the window.

21. The medium of claim 20, wherein information shared by the first context and the second context is maintained by the second context when the context control feature is manipulated to determine the second context.

22. The medium of claim 20, wherein the first context of the window corresponding to the first perspective is a first view of a set of objects and the second context of the window corresponding to the second perspective is a second view of the set of objects.

23. The medium of claim 20, wherein the first context of the window is a view of a first set of objects and the second context of the window is a view of a second set of objects.

24. The method of claim 14, further comprising:

the first perspective making available for viewing one or more object capabilities of the one or more objects corresponding to a second perspective.

25. The method of claim 24, wherein the at least one of the one or more object capabilities corresponding to the first perspective of the filtered view are more visible to a viewer of the user interface than are the one or more object capabilities corresponding to the second perspective.

26. The method of claim 24, wherein the one or more object capabilities corresponding to the second perspective are hidden from view in the user interface of the first perspective unless a manipulation of the user interface of the first perspective is performed to display the one or more object capabilities corresponding to the second perspective.

27. A user interface of a window that provides contextual information to a user of a windows-based computer environment, comprising:

a context control feature of the user interface that has one or more available contexts operable to present one or more corresponding perspectives within the window; and a content pane;

wherein manipulating the context control feature of the user interface determines a context of the window from the one or more available contexts corresponding to at least a first perspective of the one or more perspectives for viewing and manipulating a plurality of objects, with each object of the plurality of objects having one or more object capabilities, that is illustrated in the content pane of the user interface of the window and wherein the first perspective presents a filtered view of at least one of the one or more object capabilities of the one or more objects corresponding to the first perspective.

28. The user interface of claim 27, wherein the context is not determined by manipulating the context control feature of the user interface and the context is set as a default by an application of the window.

29. The user interface of claim 27, wherein the context control feature is a context list box that has the one or more available contexts in a context list.

30. The user interface of claim 27, wherein the context control feature is a context tab.

31. The user interface of claim 27, wherein the user interface further comprises a scoping pane that provides a plurality of views of the context.

32. The user interface of claim 31, wherein the user interface further comprises:

a menu bar; and one or more static toolbars, wherein one or more menus of the menu bar, one or more toolbar buttons of the one or more static toolbars, and the plurality of views of the scoping pane are defined by the context of the window.

33. The user interface of claim 27, wherein the user interface further comprises:

a menu bar; and one or more static toolbars, wherein one or more menus of the menu bar and one or more toolbar buttons of the one or more static toolbars are defined by the context of the window.

34. The user interface of claim 27, wherein the context of the window is a view of a set of objects.

35. The user interface of claim 27, wherein the context of the window is a set of tasks.

36. The user interface of claim 27, wherein the context control feature is manipulated to determine a subsequent context that is different from the context, wherein the subsequent context corresponds to a subsequent perspective of the plurality of perspectives that is different from the perspective to which the context corresponds.

37. The user interface of claim 36, wherein information shared by the context and the subsequent context is maintained by the subsequent context when the context control feature is manipulated to determine the subsequent context.

38. The user interface of claim 36, wherein the perspective to which the context of the window corresponds is a view of a set of objects and the subsequent perspective to which the subsequent context of the window corresponds is a subsequent view of the set of objects.

39. The user interface of claim 36, wherein the context of the window is a view of a first set of objects and the subsequent context of the window is a view of a second set of objects.

40. The user interface of claim 36, wherein the user interface further comprises:

a menu bar; and one or more static toolbars, wherein when the context control feature is manipulated to determine the subsequent context one or more menus of the menu bar and one or more toolbar buttons of the one or more static toolbars are defined by the subsequent context of the window.

41. The user interface of claim 27, further comprising:

the first perspective making available for viewing one or more object capabilities of the one or more objects corresponding to a second perspective.

42. The user interface of claim 41, wherein the at least one of the one or more object capabilities corresponding to the first perspective of the filtered view are more visible to a viewer of the user interface than are the one or more object capabilities corresponding to the second perspective.

43. The method of claim 41, wherein the one or more object capabilities corresponding to the second perspective are hidden from view in the user interface of the first perspective unless a manipulation of the user interface of the first perspective is performed to display the one or more object capabilities corresponding to the second perspective.

* * * * *